United States Patent
Kalinichenko

(10) Patent No.: US 12,192,718 B2
(45) Date of Patent: Jan. 7, 2025

(54) METHOD FOR OPERATING AN AUDIO DEVICE

(71) Applicant: ASK INDUSTRIES GMBH, Niederwinkling (DE)

(72) Inventor: Victor Kalinichenko, Viechtach (DE)

(73) Assignee: ASK Industries GmbH, Niederwinkling (DE)

( * ) Notice: Subject to any disclaimer, the term of this patent is extended or adjusted under 35 U.S.C. 154(b) by 499 days.

(21) Appl. No.: 17/294,525

(22) PCT Filed: Nov. 17, 2018

(86) PCT No.: PCT/EP2018/081661
§ 371 (c)(1),
(2) Date: Sep. 2, 2021

(87) PCT Pub. No.: WO2020/098961
PCT Pub. Date: May 22, 2020

(65) Prior Publication Data
US 2022/0021979 A1    Jan. 20, 2022

(51) Int. Cl.
*H04R 5/04* (2006.01)
*G06F 3/16* (2006.01)

(52) U.S. Cl.
CPC .............. *H04R 5/04* (2013.01); *G06F 3/165* (2013.01)

(58) Field of Classification Search
CPC ....... H04R 5/04; H04R 2499/13; G06F 3/165; H04S 7/30
See application file for complete search history.

(56) References Cited

U.S. PATENT DOCUMENTS 8,917,972 B2 * 12/2014 Abraham ........... H04N 21/2368
348/169
2004/0069126 A1 * 4/2004 Ludwig ................... G06F 3/041
84/645

(Continued)

FOREIGN PATENT DOCUMENTS

DE         19542961 C1    5/1997
DE     102005061002 A1    6/2007

(Continued)

OTHER PUBLICATIONS

English Translation of International Search Report & Written Opinion mailed on Jul. 19, 2019, for PCT/EP2018/081661 filed Nov. 17, 2018. pp. 1-16.

(Continued)

*Primary Examiner* — Phung-Hoang J Nguyen
(74) *Attorney, Agent, or Firm* — Dinsmore & Shohl LLP

(57) ABSTRACT

Disclosed herein is a method for operating an audio device, in particular for carrying out a morphing process, wherein audio output data are generated from audio input data containing at least one sample and/or at least one block of samples by means of at least one function stored in a data device, wherein at least one parameter of the at least one function is changeable and/or is changed in operation of the audio device, wherein at least one item of topicality information of the at least one parameter, which information indicates a state of change of the at least one parameter, is updated after the change has been made, wherein the audio output data is generated depending on the topicality information of the at least one parameter by means of the at least one changed or the at least one unchanged parameter of the at least one function.

11 Claims, 3 Drawing Sheets

(56) References Cited

U.S. PATENT DOCUMENTS

| | | | | |
|---|---|---|---|---|
| 2008/0075292 A1* | 3/2008 | Wong | ........................ | H03G 5/04 |
| | | | | 704/E21.001 |
| 2009/0132242 A1* | 5/2009 | Wang | ...................... | G10L 21/04 |
| | | | | 381/63 |
| 2010/0296679 A1* | 11/2010 | Hofmann | ............... | H04R 25/70 |
| | | | | 381/316 |
| 2017/0282790 A1* | 10/2017 | Pan | ......................... | B60T 17/22 |

FOREIGN PATENT DOCUMENTS

| | | |
|---|---|---|
| DE | 102012015376 A1 | 2/2013 |
| EP | 2254354 A1 | 11/2010 |
| WO | 01/78485 A2 | 10/2001 |
| WO | 2006106466 A1 | 10/2006 |

OTHER PUBLICATIONS

M. Slaney et al, "Automatic audio morphing," 1996 IEEE International Conference on Acoustics, Speech, and Signal Processing Conference Proceedings, vol. 2, May 9, 1996 (May 9, 1996), pp. 1001-1004. DOI: 10.1109/ICASSP.1996.543292. ISBN: 9780780331921.

\* cited by examiner

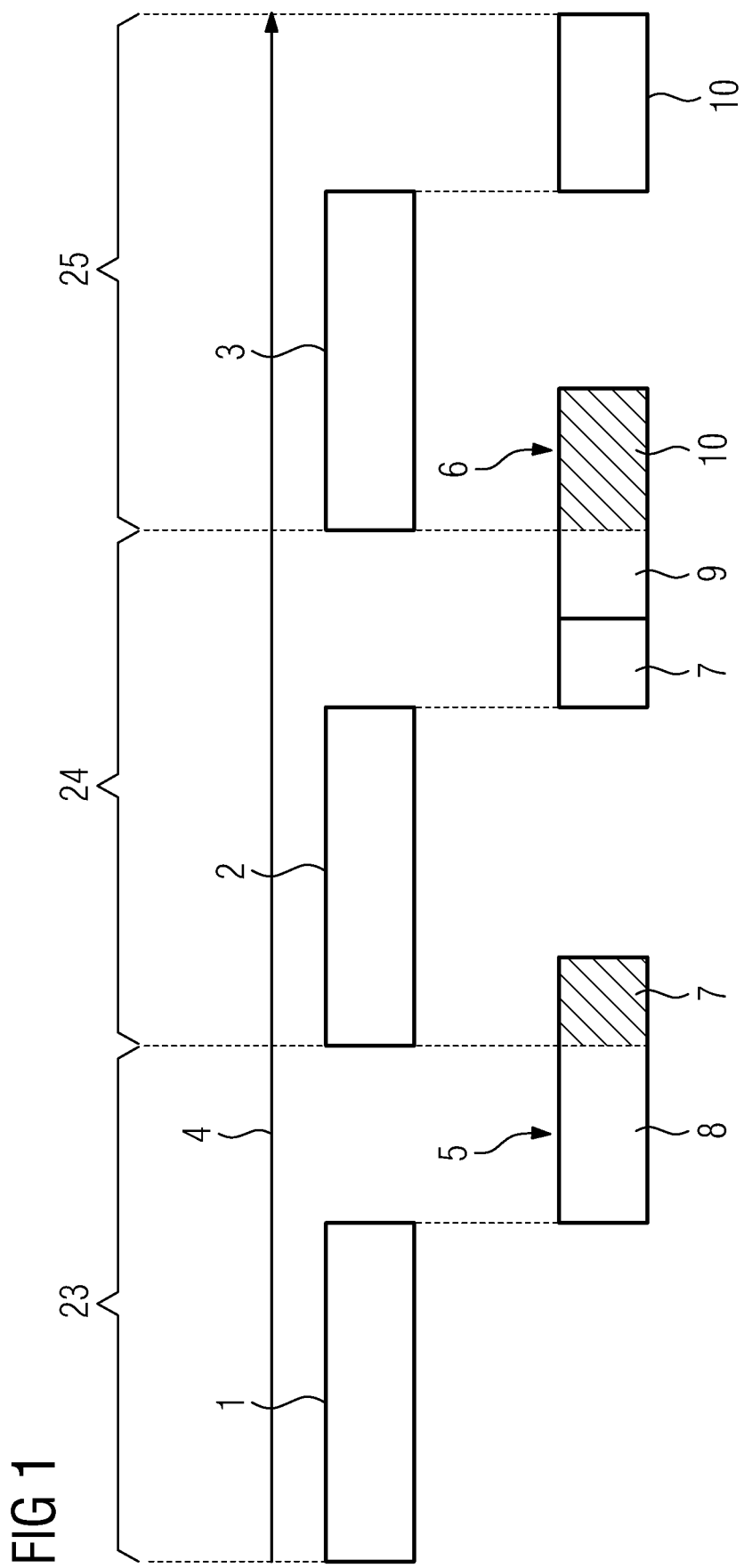

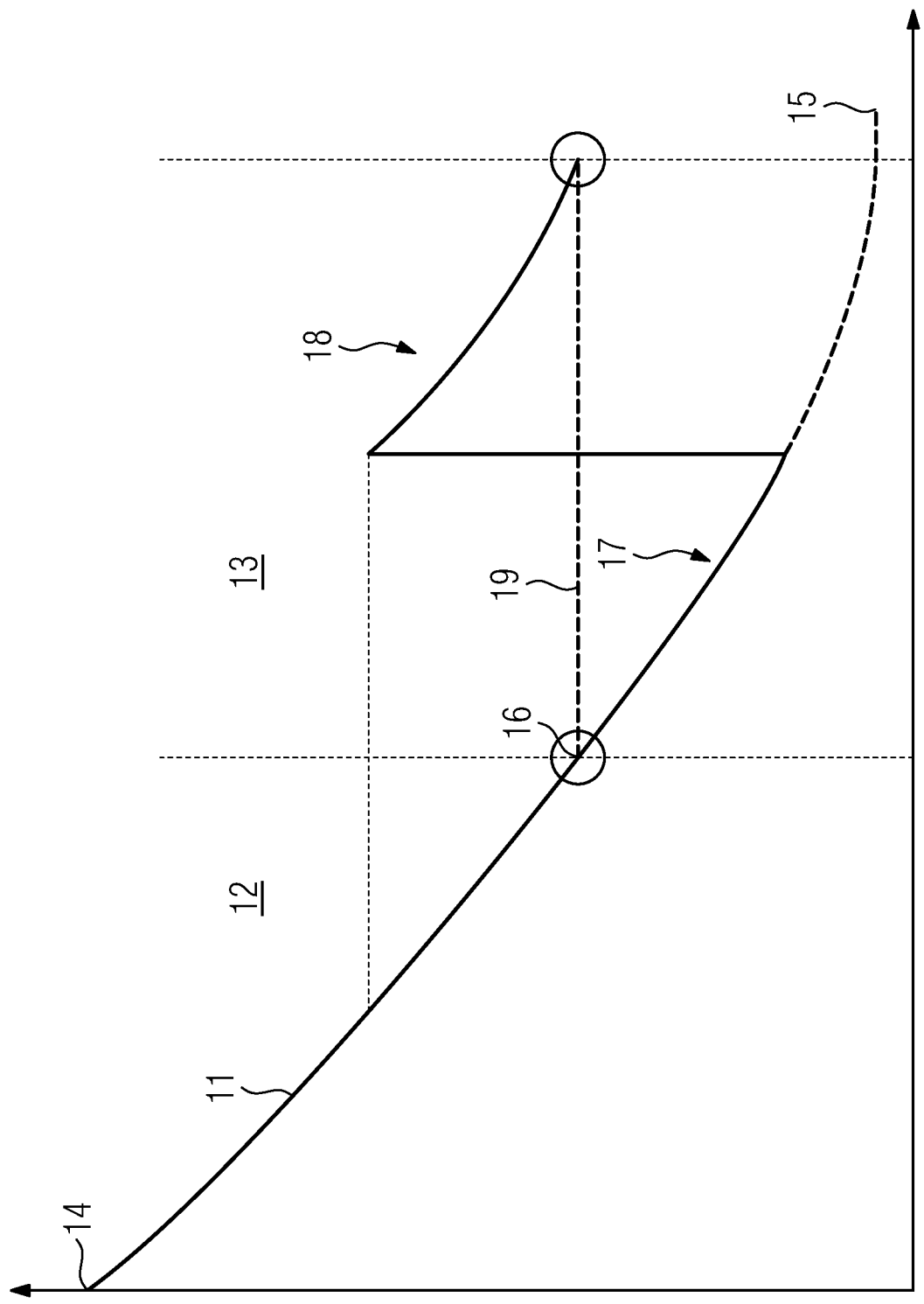

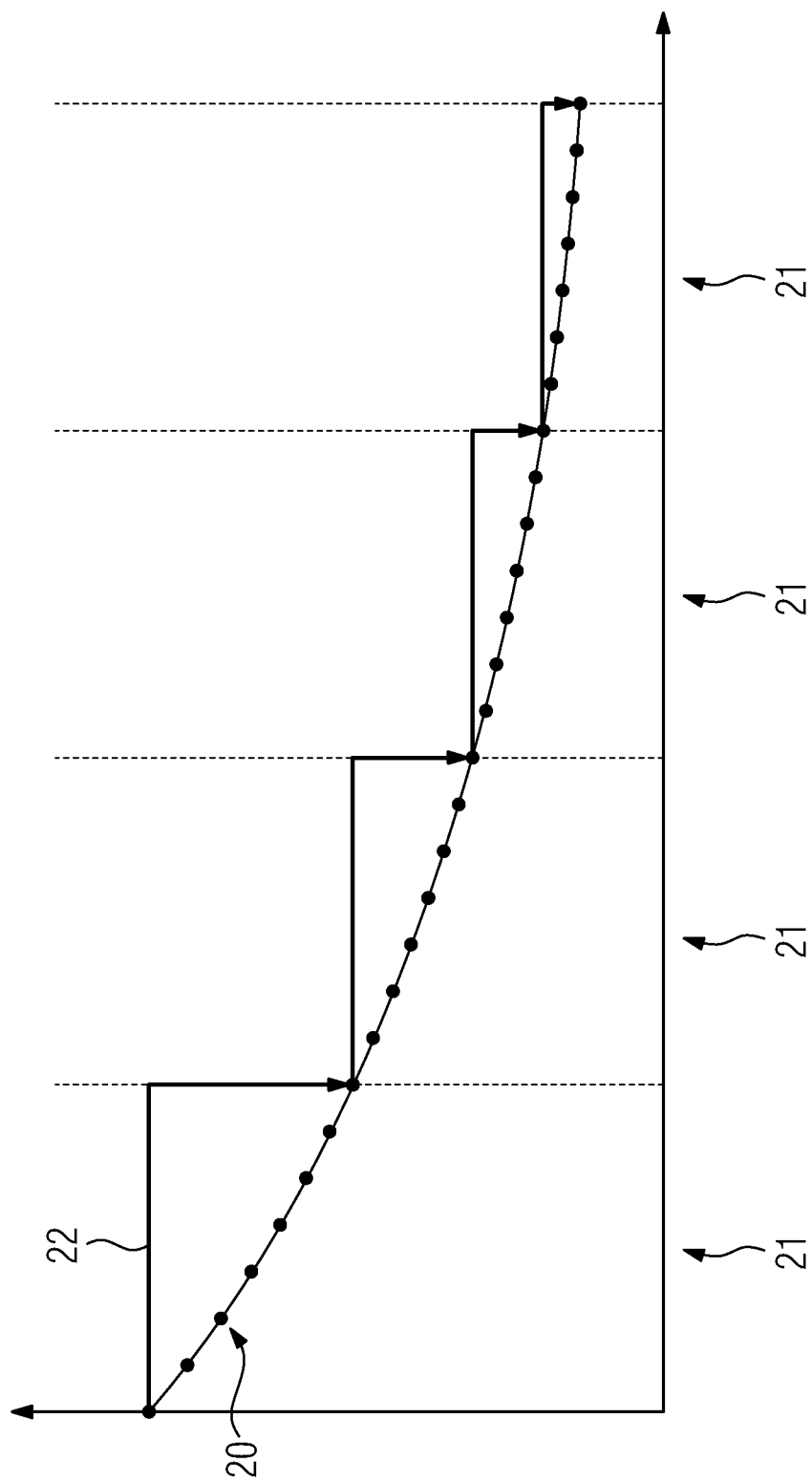

METHOD FOR OPERATING AN AUDIO DEVICE

CROSS REFERENCE TO RELATED APPLICATIONS

The present specification is a National Phase Entry of International Application No. PCT/EP2018/081661 filed Nov. 17, 2018 and entitled "Method For Operating An Audio Device" the entirety of which is incorporated by reference herein.

FIELD

The present specification relates to a method for operating an audio device of a motor vehicle, in particular for carrying out a morphing process, wherein audio output data is generated from audio input data containing at least one sample and/or at least one block of samples by means of at least one function stored in a data device, wherein at least one parameter of the at least one function is changeable and/or is changed in operation of the audio device.

BACKGROUND

Methods for operating audio devices are generally known from the prior art, for example for operating audio devices in motor vehicles. Here it is further known that from audio input data, for example raw data or intermediate data, audio output data is generated, thus data that enables the outputting of audio signals, for example via loudspeakers in the interior of the motor vehicle. In this case the audio device has a data device, for example, in which at least one function is stored that specifies how audio output data is to be generated from the audio input data. In other words, the at least one function contains at least one instruction by means of which audio output data can be generated from the audio input data.

It is known, furthermore, that the at least one function has at least one, in particular several, for example a plurality of parameters, which are changeable and/or can be changed in operation of the audio device. Examples of such parameters can be the amplification/attenuation of individual frequencies or frequency ranges in the audio spectrum or a "gain function". It is likewise possible that the sound distribution or the distribution of individual signals from a plurality of output units such as loudspeakers, for example, is coordinated or an existing coordination is changed. It is thus basically possible to influence the generation of audio output data based on the audio input data targetedly by changing one or more such parameters. The user of the audio devices can thereby adapt the generation of the audio output data to his preferences, it being possible in particular to make sound settings according to the wishes of the user.

Changing the parameters is preferably carried out not abruptly but according to a change function in order to carry out changing of the parameters incrementally or continuously and thereby in a more pleasant manner for the user, in particular so as to prevent distortions. Such changing of parameters is generally termed "morphing". It is possible in this case to change the parameter from an initial value to a target value.

In a morphing process (change process) of this kind, in which one or more parameters of the function are changed to a new target value, resources of the data device are occupied or used, in particular with respect to the processor capacity available. The data device, which is used in addition to generate the audio output data from the audio input data, is thus additionally loaded in the event of a morphing process. When changing a complex sound module in particular, which has a plurality of parameters or several functions with a plurality of parameters, the processor capacity required can exceed the processor capacity available, so that the data device is (briefly) overloaded.

This can lead on the one hand to the morphing process not being completely finished with regard to individual (several) parameters. This can further lead to faultily generated audio output data, for example fragments, which can lead to unpleasant and disruptive noises, for example distortions and thus be perceived by the user of the audio devices as unpleasant.

The data device used to generate the audio output data and to carry out the morphing process is usually designed accordingly so as to provide sufficient resources, so that such overloads or peaks in the resource requirement do not lead to an overload. This disadvantageously results in more powerful processors or several processors having to be provided in the data device, which are not used in normal operation but are only provided as security for such overload scenarios.

SUMMARY

The object underlying the present specification is therefore to specify a method for operating an audio device that is more efficient by comparison, overloads of the data devices due to morphing processes being avoided in particular.

The object is achieved by a method for operating an audio device according to claim 1. Advantageous configurations are the subject matter of the subordinate claims.

The present specification is based on the knowledge that at least one item of topicality information of the at least one parameter indicating a state of change of the at least one parameter is updated after a change is made, wherein the audio output data is generated depending on the topicality information of the at least one parameter by means of the at least one changed or the at least one unchanged parameter of the at least one function.

The present specification is accordingly based on the fact that in the event of a change of one or more parameters of the at least one function, for example as constituents of a so-called "sound module", topicality information is provided that indicates the (current) state of change of the parameter. Depending on the topicality information, it can therefore be decided whether the changed parameter is used to generate the audio output data from the audio input data by means of the function, or whether an as yet unchanged parameter, thus ultimately the initial value of the parameter of the function is used to generate the audio output data. In other words, the core of the present specification is to be seen in the fact that a morphing process is or can be carried out in blocks, wherein distortions of the audio data that is to be changed by the morphing process can be prevented.

It is accordingly possible to change parameters in the morphing process incrementally (or continuously) so that, in contrast to an abrupt change of the respective parameters from initial value to target value, no unpleasant (perceptible) change effects are generated, such as disruptive audible artifacts, for example. Instead of this, the change from initial value to target value can take place in a fluent manner. The change can be interrupted here, for example if not enough processor capacity is available, so that the audio input data can be generated into audio output data in real time and this process cannot be adversely affected or even interrupted by the morphing process.

It can accordingly be decided according to the present specification to use the unchanged parameter of the function to generate the audio output data and thus to pause/interrupt the morphing process temporarily until sufficient processor capacity is available to continue executing the morphing process. The term "interrupt" in the context of this application refers to a temporary pausing or suspension of the morphing process, for example pausing for one or more blocks of the signal. This effectively prevents the execution of the morphing process or all morphing processes simultaneously leading to an overload of the processor that results in impairment of the generation of the audio output data. Signal artifacts or perceptible impairments of the audio signal that is outputted can thus be prevented, so that the user of the audio device does not perceive any obtrusive noises during operation of the audio devices.

As described above, distortions are prevented by the method according to the present specification. The use of the method may potentially lead to the duration of the morphing process being extended. For example, the duration of a morphing process can hereby be extended by a few milliseconds, for example from 40 ms to 50 ms. An extension of this kind is not usually noticeable for a user, however.

The term "audio output data" describes audio data, in particular audio intermediate data, which following change by means of the function can be provided, in order then to be outputted, if applicable following further change, via at least one loudspeaker, for example.

The at least one parameter of the at least one function can preferably be changed on the basis of a change function, in particular a morphing function, generated in the data device or in another control device. The change function or the morphing function indicates here how the morphing process is carried out. It is possible, for example, to change the parameter continuously or incrementally from the initial value to the target value. The manner in which the parameter is changed, for example linearly, exponentially or following another arbitrary function, is determined here by the change function.

According to a particularly preferred configuration of the inventive method, it can be provided that the topicality information of at least one parameter or at least one parameter block of parameters is updated. The morphing process can be carried out incrementally or sample-wise. In FIG. 3, the incremental and sample-wise execution of a morphing process is depicted by way of example. Several samples can be combined into a so-called parameter samples block, meaning that the at least one parameter samples block has several samples, thus values of the parameter.

In FIG. 3, exemplary sample-wise execution of a morphing process is described by reference character 20, wherein several frames 21 are illustrated. Here each frame can have a defined number of samples (N samples, in this example seven). In the sample-wise execution of the morphing process, the value of the parameter is changed for each sample (of the parameter samples block), so that the parameter can have a defined value for each sample. Here all N samples of a frame 21 can be combined into a parameter samples block, for example.

In addition, an incremental change in the parameter is depicted in FIG. 3 by reference character 22. In this case the parameter is constant over all samples of the same frame 21, the change in the parameter being carried out incrementally for each frame 21.

The topicality information can be changed or updated accordingly if the at least one parameter samples block was changed to a defined portion, in particular completely, by means of the change function. In other words, the topicality information can be updated depending on the state of change of the parameter samples block. Several samples can accordingly be combined into a parameter samples block, the individual values of the parameter that the parameter samples block contains being able to be changed successively by means of the change function in order to be changed from an initial value to a target value, for example with interim attainment of intermediate values.

Here the topicality information can then be updated when the parameter or the entire parameter samples block has been changed to a defined portion, in particular completely. The parameter or the entire parameter samples block is accordingly used in changed form in the signal processing, in particular the real-time audio signal processing, as soon as all samples of the parameter samples block are at the same stage, thus have reached the target value or a defined intermediate value, for example, which is indicated by the topicality information. If the parameter samples block is incompletely updated, if only some samples of the parameter samples block are updated or changed, therefore, while other samples are still at the stage of the initial value or of an "older" intermediate value, the value of the previous parameter samples block last indicated as completely changed by the topicality information is used, for example with unchanged samples or samples having an intermediate value.

It is advantageously not necessary to provide or to reserve additional storage space to store the last parameter samples block or the last changed value, as the same storage space in which the parameter samples block or the last value is stored can be or is used. In the case that only individual values of a parameter samples block were completely changed and the other values were not changed, as described above the last valid value (of the last completely changed parameter samples block) is used until the change of the current parameter samples block is completed.

It is likewise possible to use the last changed (valid) samples of the currently only partially changed parameter samples block for the morphing process. In this case the topicality information must comprise further information, for example index information of the last changed (valid) sample of the parameter samples block. Here the value of the last changed (valid) sample is used for the unchanged samples of the parameter samples block. In this embodiment, however, additional storage is used and the complexity of the morphing algorithm increases accordingly.

It can thus preferably be provided in the method according to the present specification that the at least one changed parameter or the at least one changed parameter samples block of the function is used to generate the audio output data if the topicality information of the pertinent parameter samples block corresponds to a defined value, in particular the latest value. It can thereby be decided on the basis of the topicality information whether the at least one changed sample or the at least one changed parameter samples block is used to generate the audio output data, or whether the parameter samples block does not have the latest topicality information and thus another, in particular unchanged parameter samples block is used to generate the audio output data. Here the term "changed" or "unchanged" describes the state before or after the (a) change by means of the change function, wherein several intermediate stages/intermediate values can naturally be assumed in a morphing process, so that the parameter samples block can be changed from an initial value with the take-up of one or more intermediate stages/intermediate values to a target value. The term "unchanged" is thus also to be understood as the last completely assumed intermediate value of a parameter samples block, the term "unchanged" not necessarily describing the initial value.

In this case one of the intermediate values or the initial value can also be termed or considered "unchanged" with regard to a subsequent intermediate value or the target value. Ultimately the entire parameter samples block can advantageously be called on to generate the audio output data if all samples/entries of the parameter samples block correspond to the defined value, in particular the latest value of the topicality information.

According to another preferred configuration of the method, it can be provided that the topicality information is based on a time, in particular the system time of the audio device. "System time" is understood in the context of this application as the time that is carried in a processor, for example the processor of the data device, preferably the processor time. By using the time, in particular the system time, as topicality information it can be ensured that the parameters have a certain state of change or by setting the topicality information it can be set which parameter samples block is present in which state of change at which process point in time. It can be decided accordingly whether the parameter samples block is "up-to-date" and can be used or whether this was changed incompletely and thus cannot be used to generate the audio output data.

When executing the method according to the present specification, the change in the at least one parameter of the at least one function preferably has a lower prioritisation than the generation of the audio output data. As previously described, the generation of the audio output data takes highest priority, as impairment of the generation of the audio output data leads to audible sound artifacts or the direct absence of the audio signal that is outputted via the at least one output unit. The change in the at least one parameter is thus given a lower priority according to the present specification so that the generation of the audio output data always takes priority.

The generation of the audio output data can be carried out in real time, for example, and the change in the at least one parameter of the at least one function can be carried out in non-real time, in particular in "quasi-real time". The term "non-real time" refers to processes that are not carried out in real time. The term "non-real time" thus refers to processes that are prioritised lower compared with processes carried out in real time. It is thus ensured that the generation of the audio output data is carried out in real time and the audio output data is therefore also available in real time. If processor capacity is available in addition to the generation of the audio output data, the change in the at least one parameter can be made in non-real time, in particular in quasi-real time. For example, a morphing process can take place between the generation of two blocks of audio output data.

The change in the at least one parameter can accordingly be temporarily paused or suspended/interrupted by the generation of the audio output data, since the generation of the audio output data enjoys a higher prioritisation. It can thus be ensured that in contrast to an execution of the change in the at least one parameter in real time, which would lead to reservation of processor capacity, the change in non-real time does not necessitate such a reservation. The processor capacity released or remaining free in real time can thus be used for other real-time applications and calculations, for example for the processing of audio data or (particularly in the field of mobile devices) a reduction in the clock frequency of the processor to save energy, in particular to conserve the energy source or the battery of the unit. The data device can consequently be dimensioned smaller, as the resources for carrying out morphing processes in real time do not have to be provided. These processes are carried out instead in non-real time, so that no overload of the processor occurs, for example, but the processor capacity available, for example between two real-time applications, is utilised.

The function can further comprise a sound set with a plurality of parameters. A "sound set" is understood in the context of this application to be a function that has several modules for the generation of audio output data from audio input data, for example the effect on several frequencies of the signal spectrum. A change in the complete sound set therefore requires in total a high calculation outlay due to the changes in the individual functions and their parameters according to the change function.

Executing the morphing process in non-real time guarantees that sufficient processor capacity is available for the real-time applications, for example the generation of audio output data and the processor capacity does not have to have unnecessarily high dimensions to be able to intercept peaks that may occur during execution of the morphing process. The change in the parameters is carried out instead in non-real time, it being possible for the real-time applications to interrupt the change in parameters. Several blocks of non-real-time applications may accordingly be necessary to change the parameters of the function completely from their initial value to the target value. Such a change takes place in the range of milliseconds or seconds, however, wherein on each completed (partial) change the function for generating the audio output data is always available, the parameters being able to be used depending on the topicality information, as described previously. The function can therefore be used at each point in time of the real-time application to generate audio output data from the audio input data, the function being used for the generation, in particular its parameters, being selected depending on the topicality information.

A change in the at least one parameter of the function can preferably be carried out depending on the utilisation of a control device, in particular of at least one processor, of the audio device. The extent to which the processor capacity of the control device is already used, in particular the extent to which this is used by applications with a higher priority, can be taken into account here. Depending on the extent to which the control device is momentarily utilised, it can be decided to carry out the change in the parameter of the function or to suspend the change until appropriate resources are available. Furthermore, it can thereby be prevented that an overload of the processor occurs, which may lead to the undesirable effects already described previously.

The method according to the present specification can preferably comprise the following steps:
  generation of a change function for at least one parameter of at least one function
  changing, in particular changing in blocks, the at least one parameter in non-real time
  generation of audio output data from audio input data by means of the latest changed parameter based on the topicality information of the parameter A change function is accordingly first generated or such a function provided to morph at least one parameter of at least one function, i.e. to change it according to the change function. The at least one parameter, in particular the block of parameters, can then be changed by means of the change function, the change in the at least one parameter samples block being carried out in non-real time. Audio output data can then be generated from audio input data by means of the latest changed parameter samples block based on the topicality information of the parameter samples block.

In addition, the present specification relates to an audio device, in particular for a motor vehicle, a control device being provided that is designed to execute the inventive method as described previously.

The present specification further relates to a motor vehicle comprising an audio device according to the present specification.

BRIEF DESCRIPTION OF THE DRAWINGS

The present specification is explained in greater detail below on the basis of exemplary embodiments with reference to the figures.

FIG. 1 schematically depicts a time sequence of the generation of the audio output data;

FIG. 2 schematically depicts one in two states of change according to a change function; and FIG. 3 schematically depicts a time sequence of the generation of the audio output data.

DETAILED DESCRIPTION

FIG. 1 shows three blocks 1, 2 and 3, which are plotted along a time axis 4. On the time axis 4, three frames 23, 24 and 25 are depicted by way of example. Blocks 1-3 here describe the generation of audio output data from audio input data by means of a function or a sound set, comprising a plurality of functions. The function can be a "gain function" or any other function, for example, by means of which audio output data is obtained from the audio input data. The specific choice of function or an interplay of several functions naturally depends on the specific settings of the audio device (not shown) selected by the user, so that depending on the (sound) settings made by the user (or automatically by the audio device), other sound sets or functions and their parameters can be selected.

Blocks 1-3 are processed here in real time, i.e. the highest priority is assigned to the generation of the audio output data, so that the generation of the audio output data can interrupt other applications or processes of a lower priority. By dividing the applications into real time and non-real time, it is possible to let other processes requiring processor capacity run in addition to the generation of audio output data without adversely affecting the generation of the audio output data.

Thus there is a "window", for example between blocks 1 and 2 and between blocks 2 and 3, in which no audio output data has to be generated. Processor capacity is therefore free or processor capacity can be provided in this "window" to execute other (lower-priority) processes. In this example, processor capacity is thus free to carry out non-real time processes at the end of frames 23, 24, 25 after completion of the real-time blocks 1, 2, 3. Another such process may be a change process, for example, in particular a morphing process, in which at least one parameter of the function by means of which the audio output data is generated can be changed. For the morphing processes, blocks 5 and 6 are depicted as an example, which likewise have a certain length along the time axis 4. As described above, the time span between blocks 1 and 2 and between blocks 2 and 3 defines a time window in which processor capacity can be made available for other processes. Morphing processes can accordingly be carried out in non-real time in this time window. Blocks 5 and 6 here schematically depict parameter samples blocks.

If a morphing process were executed completely, for example according to block 5, however, this would exceed the time window present and thus potentially adversely affect the generation of the audio output data according to block 2. An overload of the processor could occur here, for example, if the sum of the processor capacity required exceeds the processor capacity available. The error-free or continuous generation of audio output data in real time would thus no longer be ensured. Distortions or other impairments of the audio output via at least one output unit, for example a loudspeaker in the interior of a motor vehicle (not depicted), could thus become perceptible for the user and thus impair the comfort of the user.

To avoid this, the morphing process of block 5 is carried out in non-real time, so that if block 5 cannot be processed in the time window available between blocks 1 and 2, it can be interrupted by block 2, thus the generation of audio output data taking place in real time according to block 2. This is depicted by a hatched portion 7 of block 5, as in the time window available only portion 8 of block 5 can be processed, so that the morphing process is interrupted by the generation of audio output data according to block 2 and portion 7 of block 5 is "left over" and block 5 was consequently not completely changed.

As can further be taken from FIG. 1, portion 7 of block 5 can be processed in the next time window available in frame 24, namely between blocks 2 and 3 processed in real time and the corresponding parameter or parameter set of the function according to block 5 can therefore be completed in this time window. Since processor capacity for more than the change in portion 7 of block 5 is available in the time window between block 2 and block 3, a further portion 9 of the next block 6 can be processed in non-real time. In this case there is again not enough time available for the morphing process running in non-real time to completely convert block 6, so that portion 10 of block 6 can be processed in turn in the time window following block 3.

Since block 5 and block 6, in particular portions 7, 8, 9 and 10 consequently are or have been only partially processed, as soon as the next block 2, 3 of audio output data must be generated in real time and thus the appropriate function must be available, the morphing process is interrupted or "frozen". The interruption of the morphing process or the freezing of the morphing process is explained below with reference to FIG. 2.

FIG. 2 shows a diagram of a change function 11 of a parameter in two states of change 12, 13 and in two so-called "frames". The change function 11 determines in this case how the parameter is to be changed in blocks (naturally also several parameters are possible) from an initial value 14 to a target value 15. The change function 11 can be chosen arbitrarily here, wherein the change function 11 depicted should be understood as being purely by way of example. Within the first time window available (state of change 12), the parameter can therefore be changed from the initial value 14 completely to an intermediate value 16. In the state of change 13, the parameter cannot be changed completely from the intermediate value 16 to the target value 15 according to the change function 11, as a real-time application, for example, occupies the processor capacity, so that the parameter samples block cannot be changed completely. Only the first four samples in the parameter samples block are changed, for example, the remaining four samples remaining in the state of change 12, meaning that the last four samples have not yet been processed and their values are unchanged compared with the last frame. A portion 17 of the parameter samples block is therefore present in changed form and a portion 18 of the parameter samples block is still present in the state of change 12. If the function based on the state of change 13 were used to generate the audio output data, the incomplete change of the parameter samples block would lead to undesirable sound effects. The line described by reference character 19 depicts the progression of the morphing function in the state of change 13, the intermediate value 16 being kept constant. It is naturally likewise possible for the complete next parameter samples block to be present unchanged. In this case the last valid value can also be used.

In this case, as described above, the morphing process is frozen or interrupted, i.e. instead of using the partially completed parameter samples block of state of change 13 for the generation of the audio output data by means of the function, the intermediate value 16 is used. The parameter is thus kept constant at the intermediate value 16 and used for the next block for the generation of the audio output data. The process is therefore also described as "freezing" the morphing process. As soon as processor capacity is available again for non-real-time application in the next available time window, i.e. following completion of the next real-time process, the parameter samples block depicted in state of change 13, in particular the portion 18 of the parameter samples block, can likewise be changed in order to get to the target value 15. Thereafter the parameter samples block can be used accordingly for the generation of the audio output data. In other words, instead of using the partially changed parameter samples block for the generation of the audio output data, the parameter is kept constant at the intermediate value 16 and only after the parameter samples block has been completely changed in both portions 17, 18 is the parameter samples block used for block-wise generation of the audio output data, i.e. the morphing process is continued.

In order to decide whether the changed parameter samples block, for example in state of change 13 or the "unchanged" parameter samples block, for example in state of change 12, is to be used to generate the audio output data, each parameter samples block can carry topicality information, which indicates the state of change 12, 13 of the parameter samples block's parameter samples block. The system time, thus a processor time of the processor used, in particular of the processor of the data device on which the processing of the audio output data or the morphing process is carried out, can be used here for example as topicality information.

Only on full completion of the morphing process, thus the entire parameter samples block for the present state of change, is the current system time entered into a place provided for this, in particular a storage location, of the parameter samples block. The stage at which the respective parameter samples block is, or how current it is, can thereby be identified by the system. Only when each parameter in the parameter samples block has the current value of the system time or the latest topicality value can the parameter samples block be used to generate the audio output data. If this is not the case, the parameter samples block last described or qualified as current, thus that which last passed completely through the morphing process, is called on to use its last parameter value.

The pertinent parameter value (cf. intermediate value 16) is therefore used constantly for the subsequent block (cf. dashed line in state of change 13). As soon as the subsequent parameter samples block has passed fully through the morphing process, this is used for the generation of the audio output data. This process is repeated until the parameter has been changed (morphed) block-wise (or sample-wise) from the initial value 14 to the target value 15.

The execution of the morphing process can be carried out in particular depending on the processor capacity available, it naturally being possible to always prioritise the execution of the generation of audio output data higher, namely in real time, than the changing of the parameter or the execution of the morphing process, which is preferably carried out in non-real time, in particular in quasi-real time.

Instead of the block-wise morphing process described with reference to FIG. 2, a sample-wise morphing process can naturally also be carried out. The audio device (not depicted) on which the inventive method described is executed can particularly preferably be arranged in a motor vehicle.

The invention claimed is:

1. A method for operating an audio device, in particular for carrying out a morphing process, wherein audio output data are generated from audio input data containing at least one sample and/or at least one block of samples by means of at least one function stored in a data device, wherein at least one parameter of the at least one function is changeable in operation of the audio device, the method comprising:
   updating at least one item of topicality information of the at least one parameter, which information indicates a state of change (12, 13) of the at least one parameter, only after the change to the at least one parameter has been made; and
   generating the audio output data depending on the topicality information of the at least one parameter based on the at least one changed parameter or the at least one unchanged parameter of the at least one function, wherein:
       the at least one parameter with a latest topicality value is used for generating the audio output data,
       the generating the audio output data depending on the topicality information of the at least one parameter comprises determining that the change to the at least one parameter cannot be completely processed in an available time window and, based upon the determination that the change to the at least one parameter cannot be completely processed in an available time window, interrupting the morphing process and generating the audio output data based on the unchanged parameter and completing the change to the at least one parameter in a next available time window, and
       the at least one changed parameter or the at least one changed parameter samples block of the function is used for the generation of the audio output data upon determining that the topicality information of the pertinent parameter or parameter samples block corresponds to a defined value, in particular corresponds to the latest value.

2. The method according to claim 1, wherein the at least one parameter of the at least one function is changed on the basis of a change function (11), in particular a morphing function, generated in the data device or a control device.

3. The method according to claim 2, wherein the topicality information of at least one parameter or at least one parameter samples block of parameters is updated when the parameter or the at least one parameter samples block has been changed to a defined portion, in particular completely, by means of the change function.

4. The method according to claim 1, wherein the topicality information is based on a time, in particular the system time of the audio device.

5. The method according to claim 1, wherein the change in the at least one parameter of the at least one function has a lower prioritisation than the generation of the audio output data.

6. The method according to claim 1, wherein the generating of the audio output data is carried out in real time and the change in the at least one parameter of the at least one function is carried out in non-real time, in particular in quasi-real time.

7. The method according to claim 1, wherein the function comprises a sound set with a plurality of parameters.

8. The method according to claim 1, wherein a change in the at least one parameter of the function is carried out depending on the utilisation of a control device, in particular of at least one processor, of the audio device.

9. The method according to claim 1, comprising the steps:
generating a change function (11) for at least one parameter of at least one function;
changing, in particular changing in blocks, the at least one parameter in non-real time; and
generating audio output data from audio input data by means of the latest changed parameter based on the topicality information of the parameter.

10. An audio device, in particular for a motor vehicle, comprising a control device, which is configured to execute the method according to claim 1.

11. A motor vehicle comprising an audio device according to claim 10.

* * * * *